(12) United States Patent
Shultz

(10) Patent No.: US 6,263,612 B1
(45) Date of Patent: Jul. 24, 2001

(54) RODENT TRAP

(76) Inventor: Donald E. Shultz, 10588 Lariat Rd., Dodge City, KS (US) 67801

( * ) Notice: Subject to any disclaimer, the term of this patent is extended or adjusted under 35 U.S.C. 154(b) by 0 days.

(21) Appl. No.: 09/442,716

(22) Filed: Nov. 18, 1999

(51) Int. Cl.[7] .................................................. A01M 23/02
(52) U.S. Cl. ............................................. 43/61; 43/66
(58) Field of Search .............................. 43/60, 61, 66, 43/131

(56) References Cited

U.S. PATENT DOCUMENTS

| | | | |
|---|---|---|---|
| 1,151,041 | * 8/1915 | Reefe | 43/66 |
| 1,286,898 | 12/1918 | Ammen . | |
| 1,415,093 | 5/1922 | Hurley . | |
| 1,422,894 | * 7/1922 | Skubinski | 43/66 |
| 1,590,879 | 6/1926 | Boynton . | |
| 1,747,380 | 2/1930 | MsCully . | |
| 1,943,177 | * 1/1934 | Harris | 43/66 |
| 2,178,789 | * 11/1939 | Heath | 43/66 |
| 2,316,888 | * 4/1943 | Schreyer | 43/66 |
| 2,475,462 | 7/1949 | Rosen | 43/61 |
| 2,787,082 | * 4/1957 | Paschen | 43/66 |
| 3,122,856 | * 3/1964 | Jones | 43/66 |
| 3,528,191 | 9/1970 | Hand | 43/64 |
| 3,733,735 | 5/1973 | Hirsch | 43/61 |
| 3,872,619 | * 3/1975 | McIlwain | 43/60 |
| 3,991,508 | * 11/1976 | Petrosky | 43/66 |
| 4,080,749 | * 3/1978 | Gilbaugh | 43/61 |
| 4,214,399 | * 7/1980 | Bradley | 43/66 |
| 4,232,472 | 11/1980 | Muelling | 43/61 |
| 4,251,944 | * 2/1981 | Fulopp | 43/66 |
| 4,318,241 | 3/1982 | Fassauer | 43/58 |
| 4,335,535 | 6/1982 | Lindley | 43/61 |
| 4,413,439 | 11/1983 | Lindley | 43/61 |
| 4,550,523 | 11/1985 | Spiller | 43/61 |
| 4,557,067 | 12/1985 | Ha | 43/61 |
| 4,567,688 | 2/1986 | MsKee | 43/61 |
| 4,578,892 | 4/1986 | Melton | 43/60 |
| 4,583,317 | 4/1986 | Beard | 43/61 |
| 4,787,170 | 11/1988 | Kingsbury | 43/61 |
| 4,829,700 | 5/1989 | Ha | 43/61 |
| 5,094,027 | 3/1992 | Smotherman | 43/60 |
| 5,148,625 | 9/1992 | Saleman | 43/121 |
| 5,299,380 | * 4/1994 | Fornal, Sr. | 43/66 |
| 5,345,710 | 9/1994 | Bitz | 43/61 |
| 5,347,747 | * 9/1994 | Henriques | 43/66 |
| 5,501,033 | * 3/1996 | Wefler | 43/131 |
| 5,528,852 | 6/1996 | Sarff | 43/71 |
| 5,564,221 | 10/1996 | Henriques | 43/61 |
| 5,809,688 | 9/1998 | Wallen | 43/61 |

* cited by examiner

Primary Examiner—Kurt Rowan
(74) Attorney, Agent, or Firm—Richard G. Heywood

(57) ABSTRACT

A trap for rodents and the like, comprising an openable housing that, in use, has a normally closed interior space for containing a trapped animal, an entranceway formed in an outer wall of the housing and leading to the interior space, and entrance-closing door means constructed and arranged to permit one-way access into the interior space, and baiter means constructed and arranged for delivering limited amounts of bait into the interior space.

10 Claims, 10 Drawing Sheets

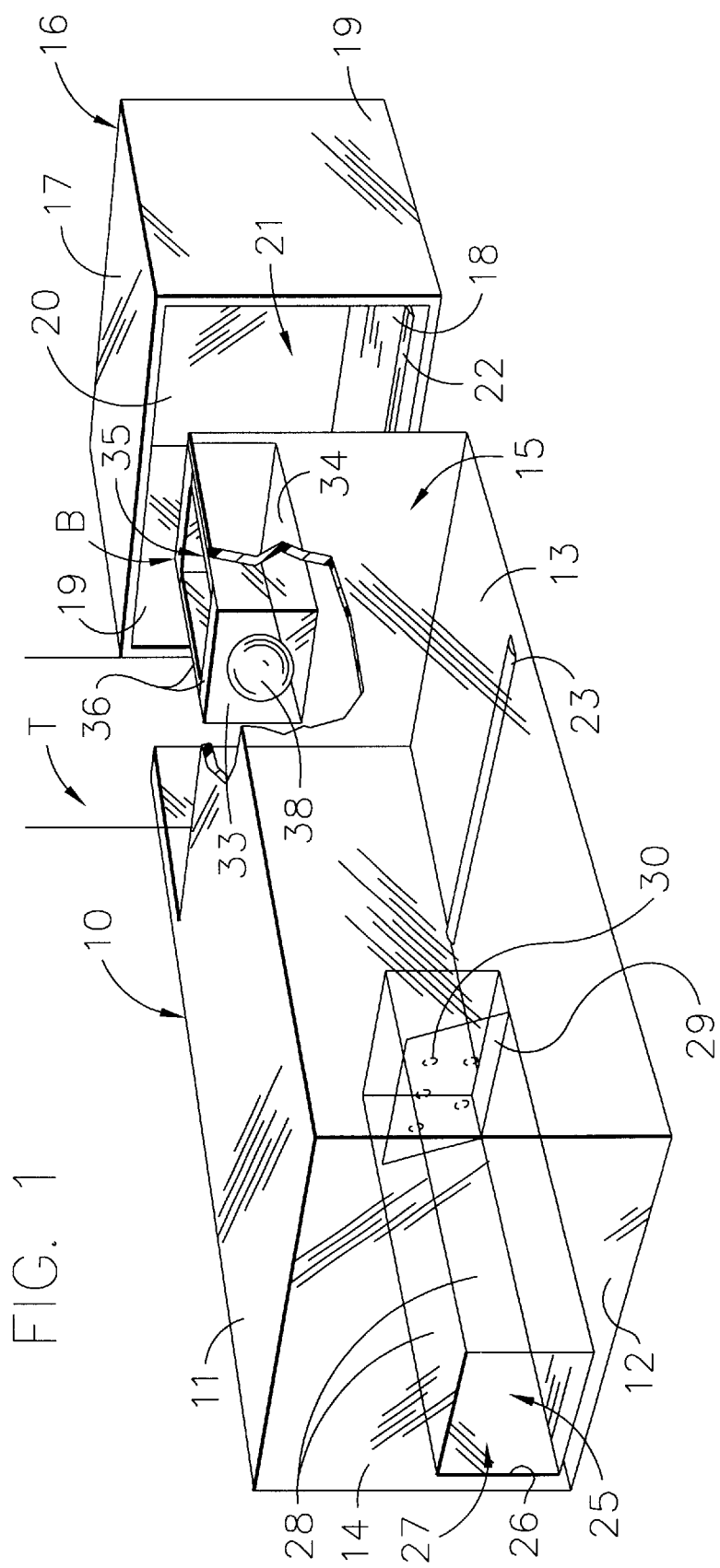

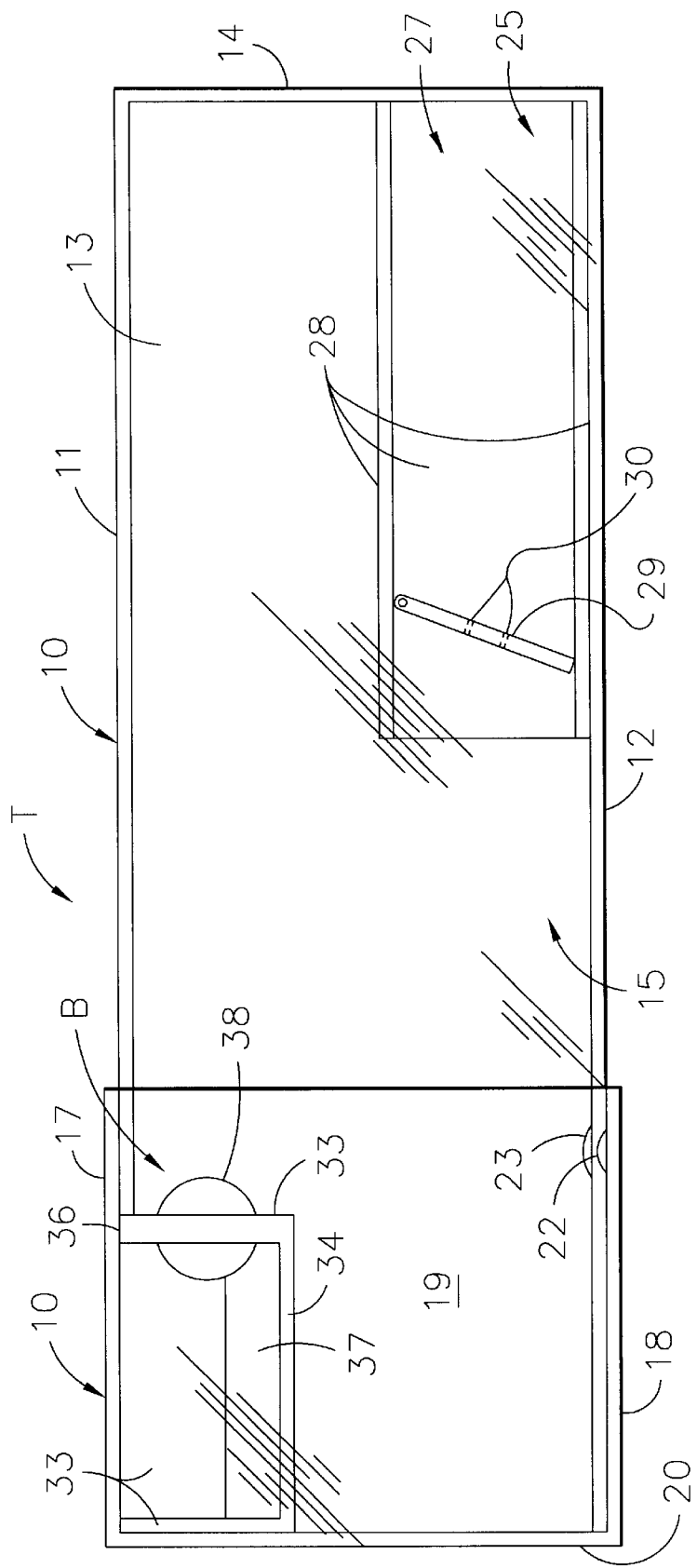

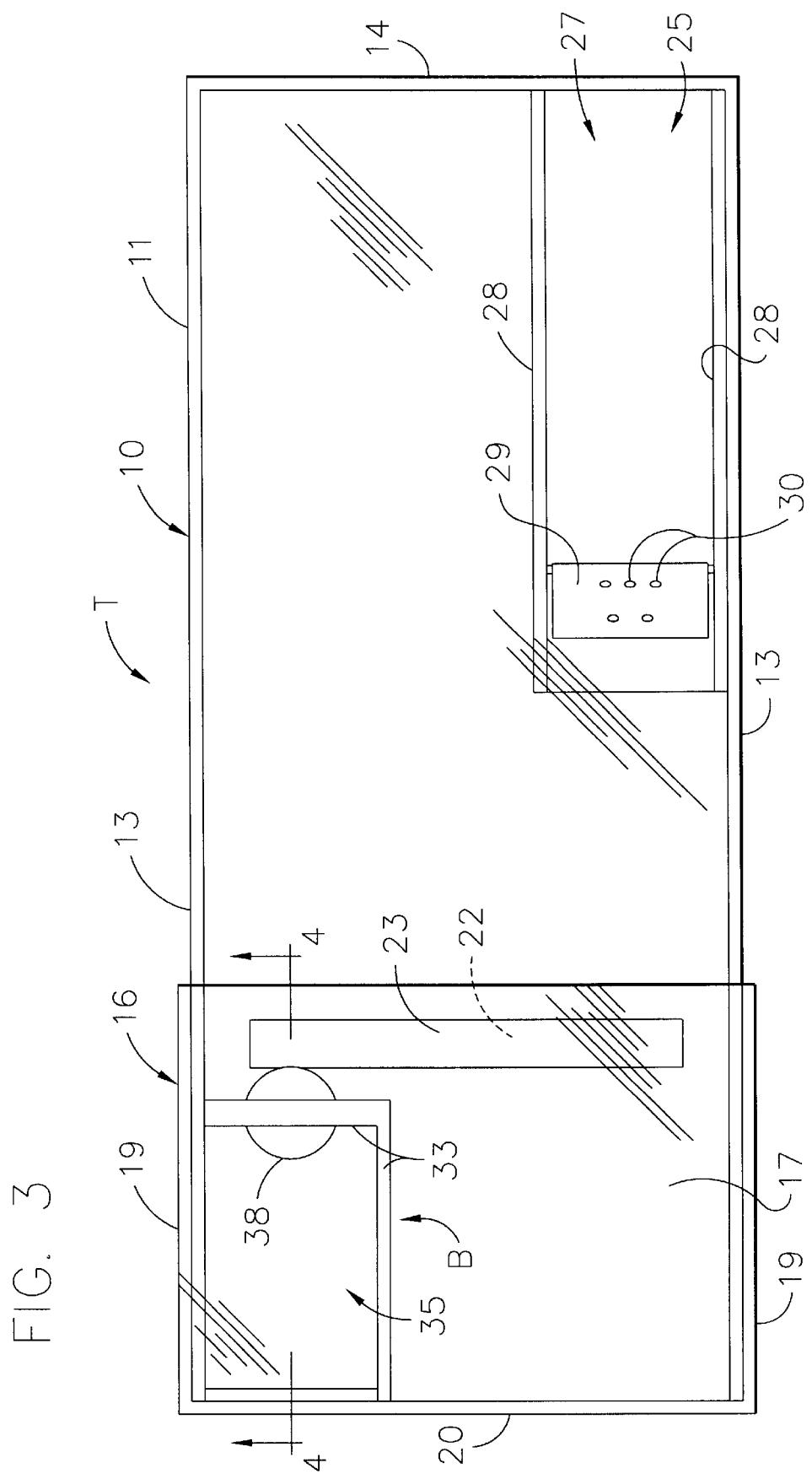

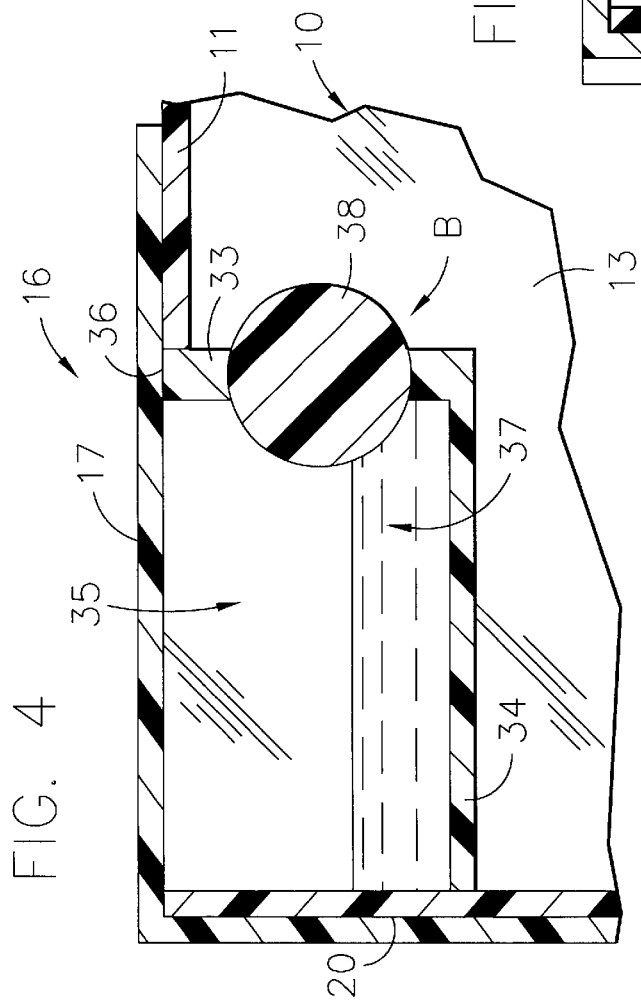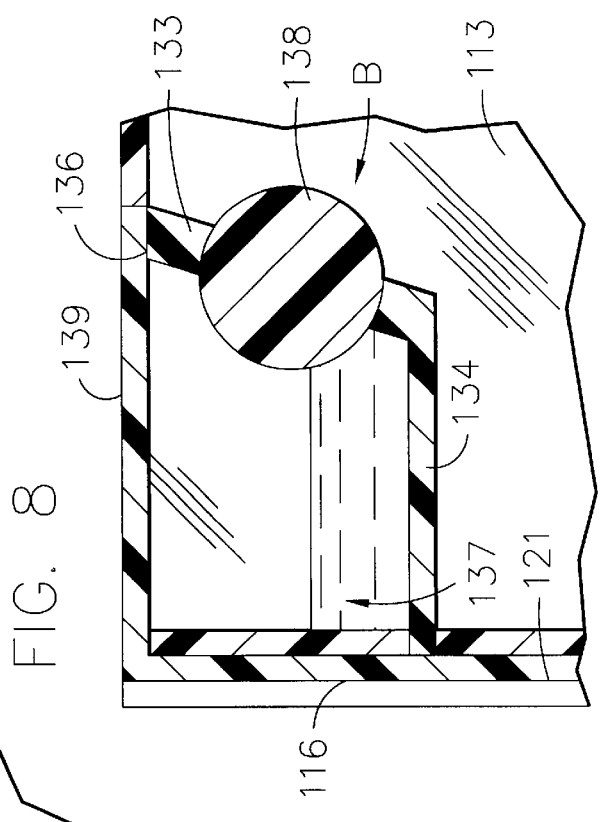

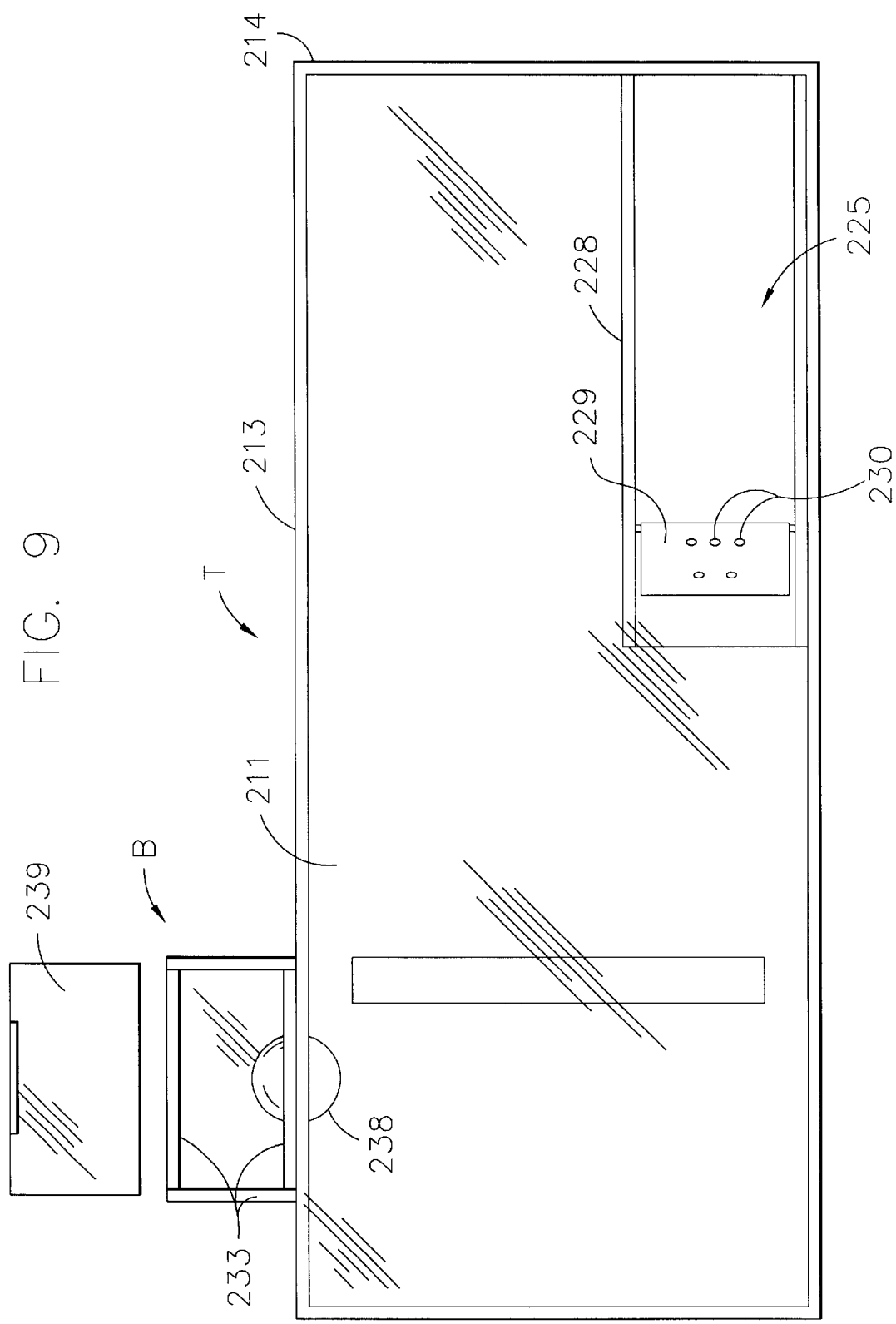

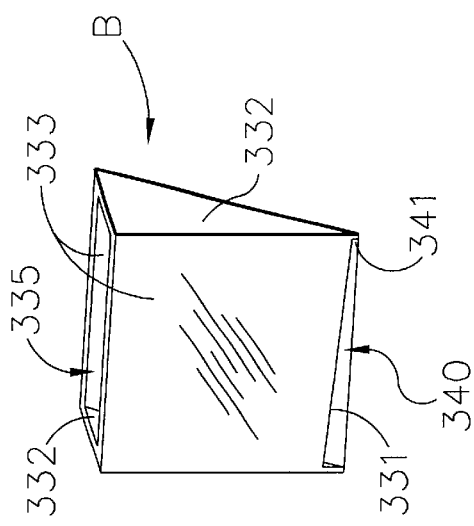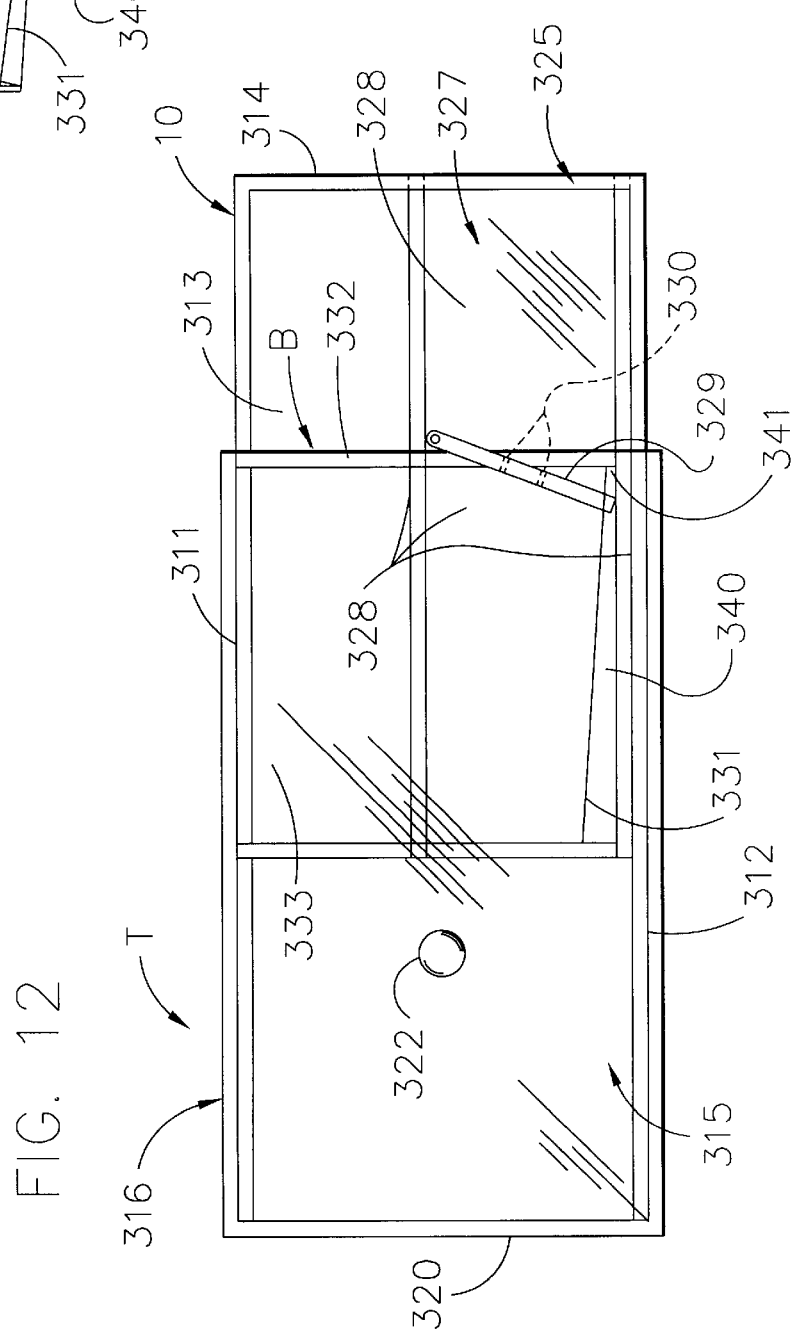

RODENT TRAP

This invention relates generally to rodent traps and more particularly, to a reusable rodent trap with baiter means for effectively trapping and killing a rodent and then permitting a clean disposal of the rodent carcass.

BACKGROUND OF THE INVENTION

Devices to trap rodents such as mice, rats and other small varmints have been extensively used throughout the world for many years. The most common and well known trap has a spring-loaded bar or jaw which is tripped when an open bait on a tripping pad is disturbed. This trap is well accepted, economical and an efficient rodent killer. However, it is potentially dangerous: care must be taken when loading bait and setting the trap to ensure the individual's fingers are not caught, and the trap can be a danger to small children and pets. Killing a rodent in this open trap can be messy and there remains the unpleasant task of disposing of the dead rodent, which means that the trap itself may simply be thrown away.

Many attempts have been made to build a better mousetrap. Examples are found in U.S. Pat. Nos. 3,528,191, 3,733,735, 4,567,688, 4,829,700, 5,094,027, 5,148,625, 5,345,710, 5,528,852, 5,564,221, and 5,809,688. They all suffer for one or more reasons. As many have discovered, a rodent trap which is capable of competing in the marketplace with the conventional spring-loaded rodent traps has proved elusive. Any new rodent trap must be economical; it must be easy to use; and it must be effective. Ideally, any new rodent trap must not only have all the economical, ease of use and effectiveness attributes of the conventional spring-loaded traps, but it also must have the other attributes of safety and cleanliness, as will readily be appreciated.

SUMMARY OF THE INVENTION

A rodent trap has a housing with a normally closed interior space and a one-way entranceway thereto, baiter means constructed and arranged for delivering limited quantities of bait into the interior space, and said trap and baiter means being readily accessible for rodent disposal, cleaning and bait replenishing.

In accordance with the invention, a novel rodent trap and baiter means is simple in construction and economical in cost; it is easy to bait and use, effective in operation, easily cleaned and safe in the presence of children and pets. An object is to provide a transparent trap that will show a trapped rodent without handling; another object is to provide a trap that can be baited with an aromatic bait and yet will dispense it in small amounts as needed, and which thereby entices a rodent into a one-way entrance passageway. These and still other objectives will become apparent hereinafter.

DESCRIPTION OF THE DRAWINGS

In the accompanying drawings which form a part of the specification and in which like numerals refer to like parts wherever they occur:

FIG. 1 is an exploded perspective view of a preferred two-piece rodent trap embodiment of the invention, FIG. 2 is a side elevation of the assembled two-piece embodiment of FIG. 1, FIG. 3 is a top plan view of the assembled rodent trap of FIG. 1, FIG. 4 is a greatly enlarged sectional view taken along line 4—4 of FIG. 3, FIG. 8 is a vertical cross-section of the second embodiment taken along line 8—8 of FIG. 7, FIG. 9 is a plan view of another modification, FIG. 12 is a side elevation of the FIG. 10 trap, and FIG. 13 is an enlarged perspective view of the baiter means per se that is shown in the FIG. 10 embodiment.

DESCRIPTION OF THE PREFERRED EMBODIMENTS

Figure 5:
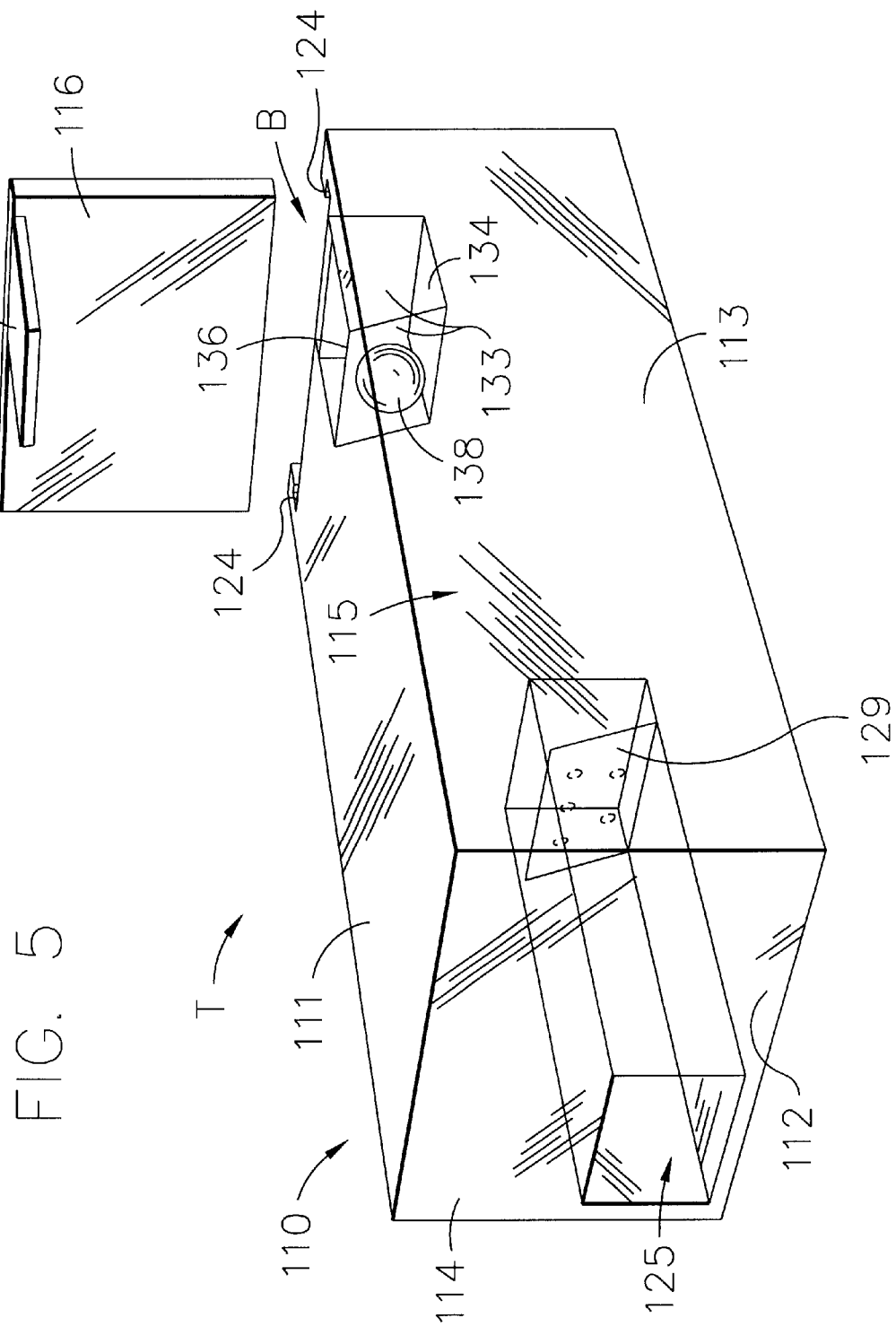
FIG. 5 is an exploded perspective view of a second embodiment of my rodent trap.
Figure 6:
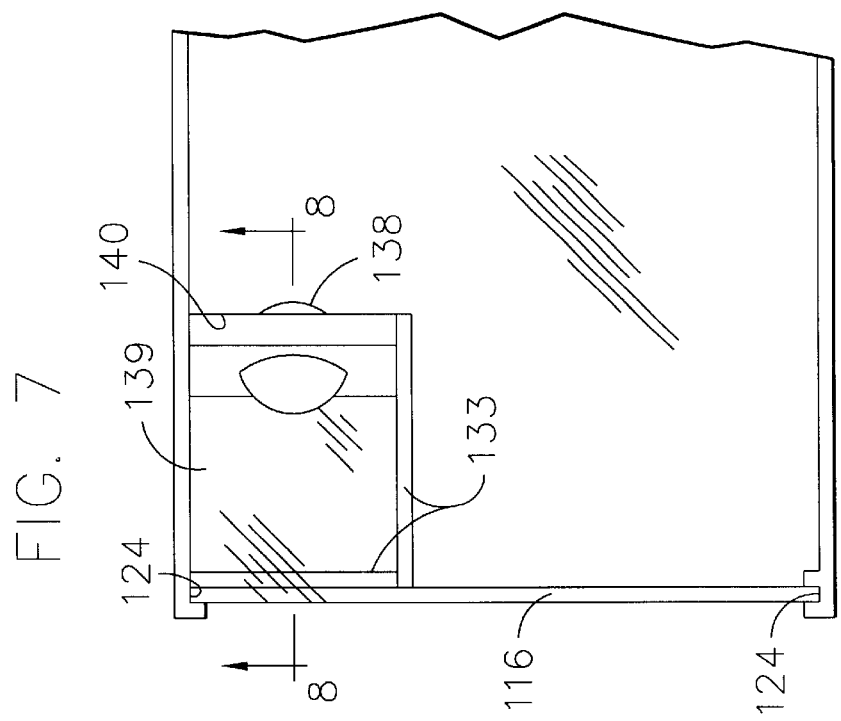
FIG. 6 is a fragmentary side elevational view of the second embodiment.

With reference to FIGS. 1–4, the presently preferred form of the invention is embodied in rodent trap T having a transparent, telescoping two-piece housing that is openable, in use, for baiting and for disposing of dead rodents. The main housing unit 10 has a top wall 11, a bottom wall 12, opposed side walls 13 and a front wall 14; all defining a rear-opening interior cavity or space 15. No rear wall is required, as the main housing 10 is closed by a telescoping cover unit 16 having a top wall 17, bottom wall 18, opposing side walls 19 and a rear wall 20. It is clear that this two-piece trap is constructed and arranged so that the front-opening cavity 21 of the cover unit 16 slidably receives the main housing unit 10; and a suitable latch or pressure device may be provided to hold the units 10 and 18 in closed assembled relationship, such as pressure bar 22 and recess 23 in the bottom walls.

An entranceway 25 is provided leading to the interior space 15 which includes an opening 26 in the front wall 14 and an elongate passageway 27 defined by top, bottom and side walls 28. It will be seen that some of these walls 28 may be in common with walls 17 of the housing unit 10, as when the entranceway 25 is located along a lower side wall corner, as shown. The entranceway 25 also has a hinged, one-way passageway-closing door 29 or the like, which may be perforated by holes 30 or the like to pass the bait odors into the passageway to entice the rodent to open the door 29.

Figure 7:
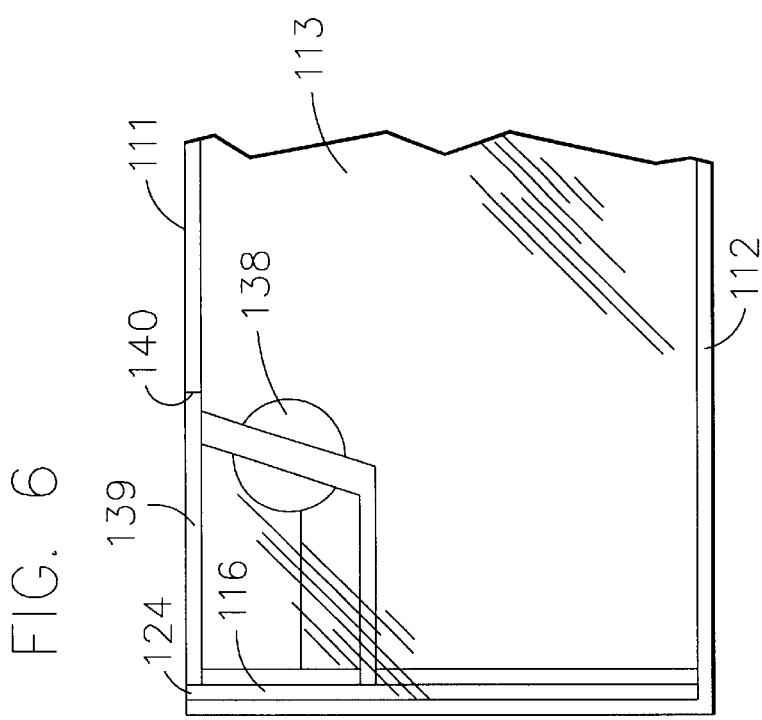
FIG. 7 is a fragmentary plan view of the second embodiment.
Figure 10:
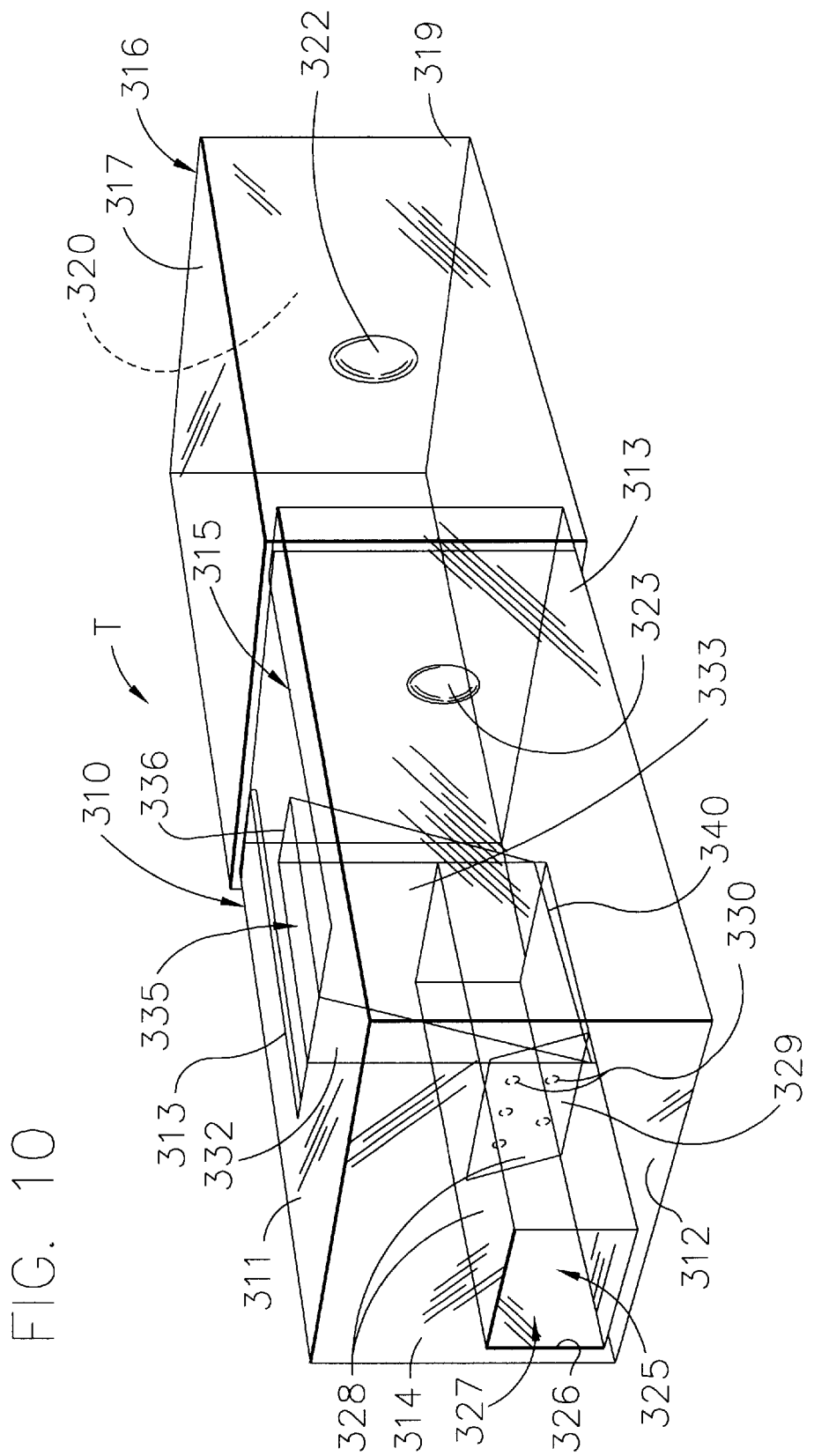
FIG. 10 is a perspective view of another two-piece embodiment of the invention, which has a different interior baiter means, and which is shown partially opened.

The baiter means B for the trap T, in one form of the invention disclosed in FIGS. 1–4, comprises a reservoir or receptacle having contiguous walls 33 and a bottom wall 34 constructed and arranged to form a bait holding cavity or well 35 for containing a flowable poisoned bait 37 (FIG. 4) which preferably is in liquid form, but may be granular. In a preferred arrangement, the top of the reservoir is open and the upper margins 36 of the side walls 33 are substantially in the same horizontal plane as the top wall 11 whereby the open top of the reservoir will be closely covered by the upper wall 17 of the end cover unit 16 when telescopically assembled on the main housing section 10. The reservoir in this embodiment includes valve means constructed and arranged to release the bait upon demand and, in the preferred form, the valve means may be a roller ball 38 rotatably mounted in one of the side walls 33 exposed to the inner space 15. Thus, the liquid bait 37 will adhere to the side of the ball valve 38 within the reservoir well 35, and the ball will rotate in the side wall as it is licked by the rodent so as to deliver the bait coating for consumption. It should be noted that the baiter "box" B can be formed as a separate four-walled unit, or one side wall (33) may be a common wall with a side wall 13 of the main housing (as indicated in FIG. 7). The ball valve 38 can also be positioned in the bottom wall 34 instead of a side wall.

Referring to FIGS. 5–8, a second embodiment of the trap T has a similar main housing unit 110 with a top wall 111, a bottom wall 112, opposed side walls 113, and a front wall 114 defining a rear opening interior space 115; and an entranceway 125 with a door 129. In this embodiment the rear side opposite the front wall 114 is open and a rear wall closure panel 116 is provided to vertically slide across the rear wall of the baiter box and in opposed channels 124 to enclose the space 115. The baiter B is also similar—having contiguous side walls 133, a bottom wall 134, an open top and a roller ball valve 138 for metering bait 137 from the reservoir cavity 135. The open top (136) of the baiter B is closed by a lid or upper wall 139 rigidly secured to the rear closure panel 116 and removable therewith for replenishing the bait in the baiter cavity. It will be seen that the top wall 111 of the main housing is notched or removed, at 140, to accommodate the open top of the baiter B and the closure lid 139 therefor.

FIG. 9 illustrates that the baiter box B can be mounted on the exterior wall 213 of a trap T in a manner that locates the roller ball valve 238 in a long side wall 233 of the baiter and the side wall 213 of the main housing. The open top of the baiter B will be closed by a sliding or hinged lid 239 and, in this embodiment, the main housing unit may have an integral rear wall (220) provided, of course, that a trap door or other movable member is provided for removal of the rodent carcass, which will be observable through the transparent walls of the main housing.

Figure 11:
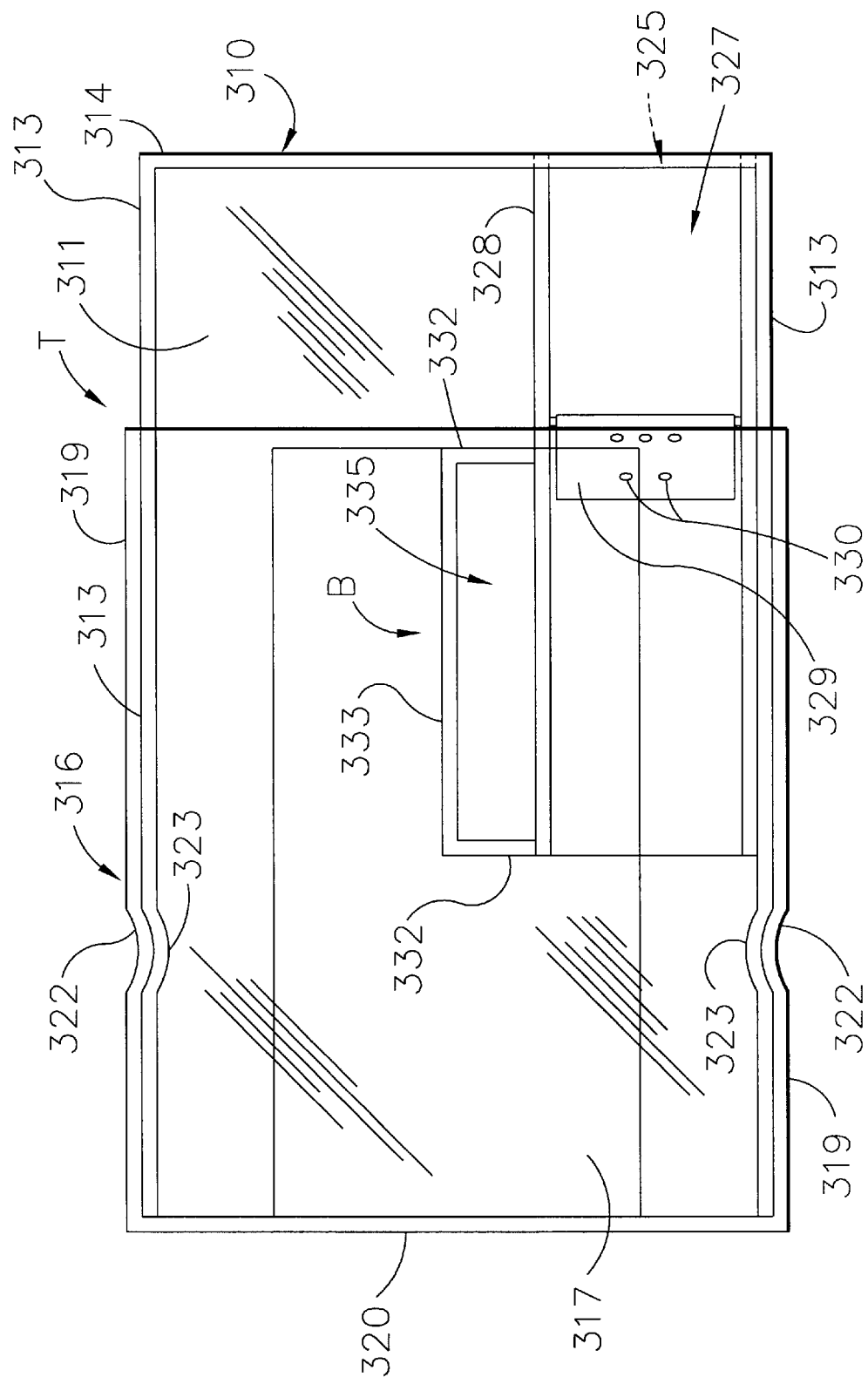
FIG. 11 is a top plan view of the FIG. 10 embodiment in closed condition.

Referring to the two-piece embodiment of FIGS. 10–13, a trough-type baiter has a V-shaped reservoir 335 with opposed, downwardly converging side walls 333, V-shaped end walls 332 and an open top 336. One wall 333 may be vertically disposed and in common with vertical wall 328 of the passageway 327, but the baiter extends vertically to the top wall 311 of the front section 310. The top wall 311 is cut out or notched to expose the open top 336 when the rear closure section 316 is slid back or removed. Thus, the baiter B can be filled and the reservoir 335 will be closed by the top wall 311 of the rear section 316 when fully telescopically assembled on the front section 310 as shown in FIGS. 11 and 12. The vertical wall 333 of the baiter trough of FIG. 13 is slotted, at 331, across its lower edge to provide an elongate opening 340 through which poisoned bait will gravity feed. This baiter trough is constructed and arranged along the one passageway wall 328 so that the slotted opening 340 has a leading end (341) disposed in the passageway 327 in front of the trap door 329 so that a very limited amount of bait is available in the passageway and the rodent will push the door open and be led further into the trap T to get more bait. The slot (331), in one form, is tapered from the leading end (341) so that more bait will be delivered and available as the rodent progresses along the passage way beyond the doorway 329, which will naturally fall into a closed position behind the rodent. An alternative form of the opening 340 would be to provide a series of feeder ports or openings (not shown) along the lower edge of the baiter B, and other variations will be readily apparent.

It should be noted that the viscosity of a flowable aromatic bait (i.e. liquified peanut butter) will be important in the performance of the baiter B. In the FIGS. 1–9 embodiments the bait adheres to the ball-type valve (38, 138, 238) by surface tension as it rotates in the well (35); whereas in the FIGS. 10–13 embodiment the bait will settle in the trough by gravity and be licked out or seep through the slotted delivery means.

The baiter B is constructed of a strong plastic material, and a feature of the invention is the transparency of the trap T which thereby permits visual inspection to determine if any rodent has been caught and/or killed as well as allowing inspection of the condition of the bait. It will be seen that the latching means for locking engagement between the front and rear sections 310 and 316, when fully telescoped in closed position, may be cooperating embossments 322 and 323 formed in the side walls 313 and 319 on at least one side of the trap T. The side walls are sufficiently yieldable to accommodate sliding movement of inwardly formed bosses 322 on lower side walls 319 along the front section and into locking position (FIG. 11). It will be understood that more than one valve (38, 138) may be provided, and the valve may be positioned in a baiter bottom wall (34, 134, 234) as well as on a side wall (33, 233). Further, although the preferred form of the invention lends itself to the use of poisoned bait as a viscous liquid (a peanut butter oil or the like), other types of poisoned feed or grain may be used with other types of valve dispensers or with gravity feed baiters.

The disclosure is intended to cover changes and modifications which will be readily apparent to those skilled in the art.

What is claimed is:

1. A trap for rodents, comprising an openable housing that, in use, has a normally closed interior space for containing a trapped animal, an entranceway formed in an outer wall of the housing and an entranceway passage leading to the interior space, and passage-closing door means constructed and arranged to permit one-way access into the interior space, and baiter means constructed and arranged with a bait holding cavity generally inaccessible to a trapped rodent in the interior space and forming a reservoir for holding a flowable bait, and means for delivering the flowable bait from the reservoir into the interior space, said receptacle being defined, in part, by at least one wall positioned within the interior space, and said bait delivery means being constructed and arranged in said one wall for delivering the flowable bait from the reservoir into the interior space, said bait delivery means comprising a ball valve rotatably mounted in said one wall, said ball valve having an outer bait carrying surface rotatable through said reservoir whereby said flowable bait adheres to the outer bait carrying surface and is moved to the interior space.

2. A trap for rodents, comprising an openable housing that, in use, has a normally closed interior space for containing a trapped animal, an entranceway formed in an outer wall of the housing and an entranceway passage leading to the interior space, and passage-closing door means constructed and arranged to permit one-way access into the interior space, and baiter means constructed and arranged with a bait holding cavity generally inaccessible to a trapped rodent in the interior space and forming a reservoir for holding a flowable bait, and means for delivering the flowable bait from the reservoir into the interior space, said receptacle being defined, in part, by at least one wall positioned within the interior space, and said bait delivery means being constructed and arranged in said one wall for delivering the flowable bait from the reservoir into the interior space, and said one wall being constructed and arranged adjacent to one side of said entranceway passage, and said bait delivery means includes a bait opening from the reservoir for delivering flowable bait to the interior space adjacent to the passage closing door means, said one wall extending along one side of the entranceway passage, and said bait opening extending from the interior space into the entranceway passage.

3. The trap of claim 2, in which said bait opening has portions that deliver flowable bait on both sides of said door means.

4. The trap of claim 2, in which said bait opening is tapered.

5. A trap for rodents, comprising an openable housing that, in use, has a normally closed interior space for containing a trapped animal, an entranceway formed in an outer wall of the housing and an entranceway passage leading to the interior space, and passage-closing door means constructed and arranged to permit one-way access into the interior space, and baiter means constructed and arranged with a bait holding cavity generally inaccessible to a trapped rodent in the interior space and forming a reservoir for holding a flowable bait, and means for delivering the flowable bait from the reservoir into the interior space, said openable housing comprising a main housing unit having an open-end, and a removable closure means for covering the open end for use, said closure means comprising a second open-ended housing unit constructed and arranged to telescopically slide over the open end of the main housing unit for closing the interior space.

6. The trap of claim 5, in which the baiter means comprises an open-topped bait reservoir positioned within the interior space.

7. The trap of claim 6 in which said second housing unit telescopically covers the open top of said baiter means in use.

8. A trap for rodents, comprising:

an openable housing that, in use, has a normally closed interior space for containing a trapped rodent and at least one wall of said housing being transparent, an elongated entranceway leading to the interior space, and door means constructed and arranged to permit one-way passage through the entranceway to the interior space, and baiter means constructed and arranged with bait delivery means for delivering a flowable bait accessible to a trapped rodent on the interior space side of the door means, said baiter means comprising a receptacle with a bait holding reservoir generally inaccessible to a trapped rodent and having a top opening for replenishing a flowable bait in the reservoir, and closure means for covering the top opening, said bait delivery means being formed in one vertical wall of said receptacle, and comprises opening means in said one wall for the flow of liquified bait from the reservoir to the interior space or entranceway thereto, said opening means in said one wall being in communication with the entranceway on the interior space side of the door for controlling bait flow thereto, and further includes a bait flow portion on both sides of said door means in said entranceway.

9. The trap of claim 8, in which said door means is perforated to enhance the passage of bait odors exterior of said trap.

10. A trap for rodents, comprising an openable housing that, in use, has a normally closed interior space for containing a trapped animal, an entranceway formed in an outer wall of the housing and an entranceway passage leading to the interior space, and passage-closing door means constructed and arranged to permit one-way access into the interior space, baiter means constructed and arranged with a bait holding cavity generally inaccessible to a trapped rodent in the interior space and forming a reservoir for holding a flowable bait, and means for delivering the flowable bait from the reservoir into the interior space, said reservoir being defined, in part, by at least one wall surface positioned within the interior space, and said bait delivery means being constructed and arranged in said one wall for delivering the flowable bait from the reservoir into the interior space, said one wall being positioned adjacent to and extending along one side of said entranceway passage, and said bait delivery means includes a bait opening from the reservoir and extending from the interior space into the entranceway passage for delivering flowable bait to the interior space and on both sides of the passage-closing door means.

* * * * *